US008327342B2

(12) United States Patent
Komatsu et al.

(10) Patent No.: US 8,327,342 B2
(45) Date of Patent: Dec. 4, 2012

(54) METHOD OF REDUCING LOGGING CODE IN A COMPUTING SYSTEM

(75) Inventors: Hideaki Komatsu, Yokohama (JP); Takuya Nakaike, Yokohama (JP); Rei Odaira, Yomato (JP)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 12/168,206

(22) Filed: Jul. 7, 2008

(65) Prior Publication Data
US 2010/0005457 A1 Jan. 7, 2010

(51) Int. Cl.
*G06F 9/45* (2006.01)
(52) U.S. Cl. ...................................................... 717/145
(58) Field of Classification Search ................... 717/145
See application file for complete search history.

(56) References Cited

U.S. PATENT DOCUMENTS

| | | | | |
|---|---|---|---|---|
| 6,249,912 | B1 * | 6/2001 | Blandy | 717/127 |
| 6,971,091 | B1 * | 11/2005 | Arnold et al. | 717/145 |
| 7,810,085 | B2 * | 10/2010 | Shinnar et al. | 717/156 |
| 7,913,236 | B2 * | 3/2011 | Adl-tabatabai et al. | 717/140 |
| 2005/0283780 | A1 * | 12/2005 | Karp et al. | 718/100 |
| 2007/0143741 | A1 * | 6/2007 | Harris | 717/121 |
| 2007/0169031 | A1 * | 7/2007 | Harris | 717/140 |
| 2008/0034355 | A1 * | 2/2008 | Shen et al. | 717/148 |
| 2008/0235672 | A1 * | 9/2008 | Lozano et al. | 717/140 |
| 2008/0301664 | A1 * | 12/2008 | Callahan et al. | 717/170 |

OTHER PUBLICATIONS

Marathe, et al., Lowering the Overhead of Nonblocking Software Transactional Memory, PLDI'06 (2006).*
Ali-Reza Adl-Tabarabai et al, Compiler and Runtime Support for Efficient Software Transactional Memory, PLDI'06, Jun. 10-16, 2006, pp. 26-37, Ottawa, Ontario Canada.
C. Scott Anaian et al, Unbounded Transactional Memory, Proceedings of the Symposium on High Performance Computer Architecture (HPCA-11), 2005, pp. 12.
Kevin E. Moore et al, LogTM: Log-based Transactional Memory, 12 Annual International Symposium on High Performance Computer Architecture (HPCA-12), Feb. 11-15, 2006, pp. 12.
Peter Damron et al, Hybrid Transactional Memory, ASPLOS'06, Oct. 21-25, 2006, pp. 11, San Jose, CA.
Tim Harris et al, Optimizing Memory Transactions, PLDI'06, Jun. 10-16, 2006, pp. 14-25, Ottawa, Ontario Canada.

* cited by examiner

*Primary Examiner* — Wei Zhen
*Assistant Examiner* — Kevin Dothager
(74) *Attorney, Agent, or Firm* — Cantor Colburn LLP; Vazken Alexanian

(57) ABSTRACT

A computing system for reducing logging code includes a virtual machine configured to control the flow of operations in the computing system and a compiler configured to receive bytecode instructions from the virtual machine and convert the bytecode instructions into machine instructions. The computing system also includes a compilation store configured to receive and store the machine instructions from the compiler and a recompilation store configured to receive and store recompiled machine instructions from the compiler. The system also includes a software transactional memory engine configured to receive instructions from the compilation store or, in the event that the recompilation store has recompiled machine instructions stored therein, from the recompilation store.

14 Claims, 4 Drawing Sheets

METHOD OF REDUCING LOGGING CODE IN A COMPUTING SYSTEM

BACKGROUND

The present disclosure relates generally to programming code related to compilers and, in particular, to reducing logging code generated by just-in-time compilers.

In computing, just-in-time (JIT) compilation, also known as dynamic translation, is a technique for improving the runtime performance of a computer program running on a computer. JIT compilers build upon two earlier ideas in run-time environments: bytecode compilation and dynamic compilation. It converts code at runtime, for example, bytecode into native machine code.

In a bytecode-compiled system, source code is translated to an intermediate representation known as bytecode. Bytecode is not the machine code for any particular computer, and may be portable among computer architectures. The bytecode may then be interpreted, or run, on a virtual machine. A just-in-time compiler can be used as a way to speed up execution of bytecode. At the time the bytecode is run, the just-in-time compiler will compile some or all of it to native machine code for better performance. This can be done per-file, per-function or even on any arbitrary code fragment; the code can be compiled when it is about to be executed (hence the name "just-in-time").

The performance improvement over interpreters originates from caching the results of translating blocks of code, and not simply reevaluating each line or operand each time it is met. It also has advantages over statically compiling the code at development time, as it can recompile the code if this is found to be advantageous, and may be able to enforce security guarantees. Thus, JIT can combine some of the advantages of interpretation and static (or complete program) compilation.

In contrast, a traditional interpreted virtual machine will simply interpret the bytecode, generally with much lower performance. Some interpreters even interpret source code, without the step of first compiling to bytecode, with even worse performance. Statically compiled code or native code is compiled prior to deployment. A dynamic compilation environment is one in which the compiler can be used during execution. For instance, most Common Lisp systems have a compile function that can compile new functions created during the run. This provides many of the advantages of JIT, but the programmer, rather than the runtime, is in control of what parts of the code are compiled. This can also compile dynamically generated code, which can, in many scenarios, provide substantial performance advantages over statically compiled code, as well as over most JIT systems.

In a multi-thread program, when accessing variables shared by multiple threads, a synchronization mechanism is necessary regardless of compilation techniques used. One example of a synchronization mechanism is an exclusive control lock. Such a mechanism locks certain portions of the code from access by all but one other location. However, when a portion of the code that is exclusively executed ("critical section") becomes large, parallelism is harmed and performance is degraded.

In order to solve this problem, a transactional memory system has been proposed as a lock-free synchronization mechanism. A transactional memory system treats the critical section as a transaction to shield memory operations in the transaction. That is, changes in the memory during the transaction cannot be seen from other transactions until the transaction is committed. To do so, the transactional memory system logs a memory access to shared variables in the transaction so as to analyze a conflict in the shared variables at the end of the transaction. For example, when a value change of variable V in a transaction T1 is committed and a transaction T2 reads the value of the variable V prior to the commit of T1, T2 reads an old value of the variable V. That is, a conflict occurs between T1 and T2 and the commit of T2 fails.

In transactional memory systems, regardless of implementation, reducing code for logging memory access to a shared variable ("logging code") is very important for performance improvement. Logging code is used to keep track of the version number assigned to particular variable. In some embodiments, the version number of a variable is updated when the value of the variable is changed in the shared memory at the commit time.

In a software transactional memory (STM) system, overhead for the logging code is very large because the logging code includes from several tens to several hundreds of instructions. When there is hardware support for transactional memory, the logging code is usually made of one instruction, however, that does not mean that there is no overhead when logging. For example, as for a best-effort type hybrid transactional memory, it is possible to execute a transaction whose log size does not exceed the size of the log buffer supported by hardware. However, because the transaction whose log size exceeds the capacity of hardware is processed by software, a large overhead may still appear.

Other systems may include hardware transactional memories capable of treating almost unlimited log sizes. However, because logs are recorded in the memory, when the log size becomes larger, the log causes decreased processor cache performance.

Compiler optimization techniques have been proposed in order to reduce the logging code for variables that never cause conflict. These techniques are largely classified into two categories: logging code reduction method for immutable objects and reducing logging codes for transaction-local objects. An immutable object is an object whose state cannot be modified after it is created and a transaction local object is an object that is created in the transaction.

As to the first category, in Java, objects of a basic class such as java.lang.String and java.lang.Integer are immutable and no log is required for the fields belonging to them. During compile, one method prepares a transaction version (a version including a logging code) and non-transaction version (a version not inclusive of the logging code). For the class of immutable objects, only a non-transaction version is prepared if the object does not access other objects.

As to the second category, because a transaction local object created in a certain transaction cannot be accessed from other transactions, no log is required for those objects. One approach to eliminate logs to transaction-local objects is to analyze the accesses to a newly created object on an intermediate representation and omit the logging code for those accesses.

SUMMARY

One embodiment of the present invention is directed to a computing system for reducing logging code. The computing system of this embodiment includes a virtual machine configured to control the flow of operations in the computing system and a compiler. The compiler is configured to receive bytecode instructions from the virtual machine and convert the bytecode instructions into machine instructions. The machine instructions including at least one log instruction. The computing system of this embodiment also includes a compilation store configured to receive and store the machine instructions from the compiler and a recompilation store configured to receive and store recompiled machine instructions from the compiler. The recompilation store does not include the at least one log instruction. The system also includes a software transactional memory engine configured to receive instructions from the compilation store or, in the event that the recompilation store has recompiled machine instructions stored therein, from the recompilation store.

Another embodiment of the present invention is directed to a method of reducing logging code for conflict free fields in a transactional memory system. The method of this embodiment includes receiving bytecode instructions at a compiler, the bytecode instructions building a methods, the method including one or more fields and one or more field accesses; compiling the bytecode instructions into machine instructions; storing the machine instructions in a compilation store; determining for of the one or more fields, the number of write operations in the machine related thereto to be executed in a particular transaction; recompiling the bytecode into recompiled machine code, recompiling including removing logging code for fields having zero write operations related thereto; and storing the recompiled machine code in a recompilation store.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
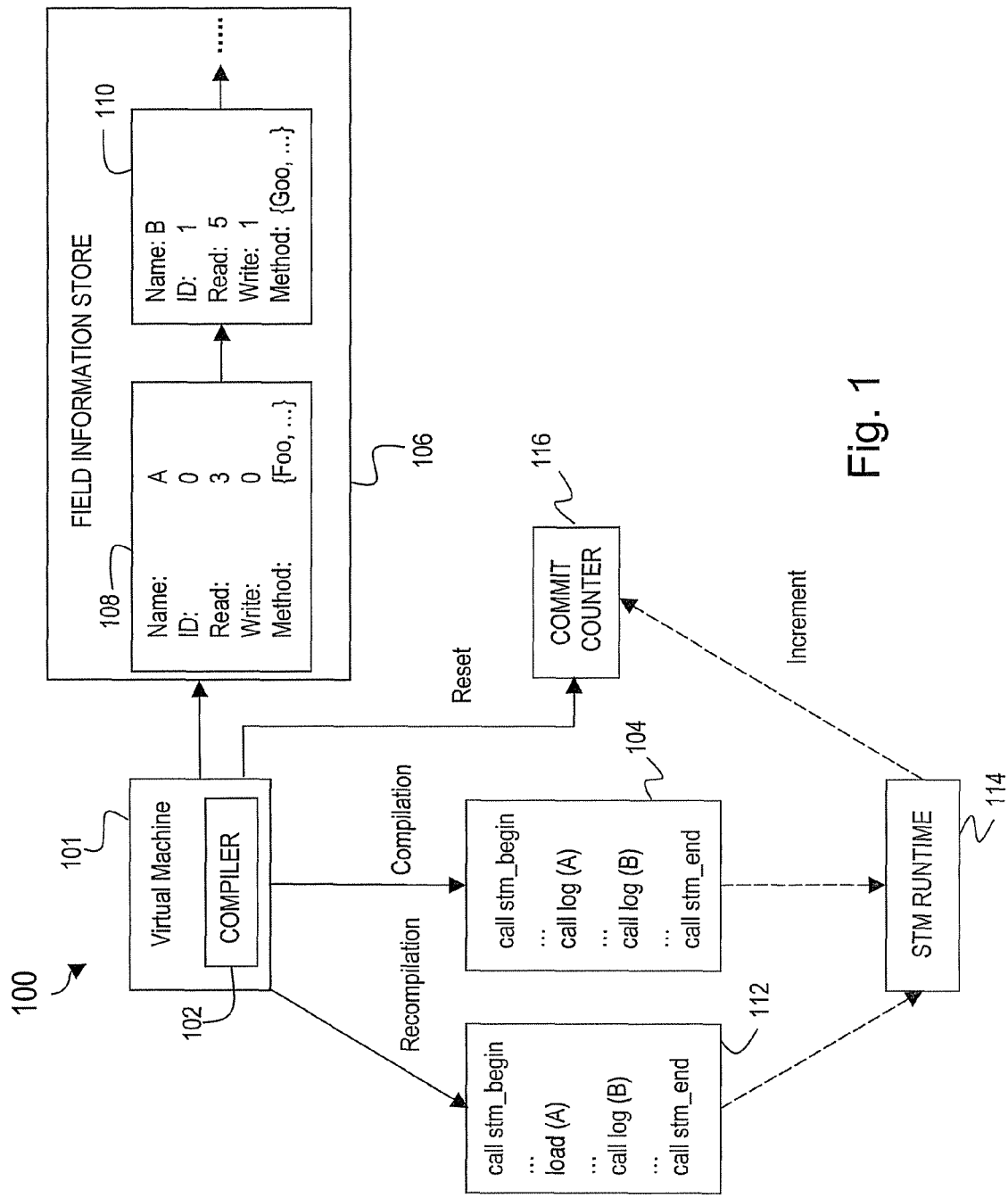
FIG. 1 is block diagram showing a system according to one embodiment of the present invention.

The detailed description explains the preferred embodiments of the invention, together with advantages and features, by way of example with reference to the drawings.

DETAILED DESCRIPTION

Several problems exist with the above-mentioned methods. First, when reducing logging code for a field that never causes a conflict only in an immutable object of a special class it is not possible to reduce the log of a field that never causes a conflict in other than the immutable object of the special class. A whole program analysis can be used to detect an invariant field which does not belong to any special class whose objects are known to be immutable, but it is difficult in the case of a programming language that supports a dynamic class loading and an execution path that is not finalized until the execution time, like Java. Further, optimization techniques exist for detecting a variable whose value remains unchanged at a certain point of the program by constant value propagation and value profiling. However, the optimization does not detect an unchangeable variable in the transaction. Therefore, it is not possible to use it for deleting the logging code. For example, while the value of a variable may change at a certain point, if that change does not occur during the transaction, it is possible to eliminate the logging code during that transaction.

Second, when reducing logging for immutable objects, objects other than the immutable object are sometimes accessed, so that by simply calling methods of the non-transaction version, it is not possible to completely eliminate the logging code for the immutable object.

The present invention may overcome some or all of the problems discussed above. In one embodiment, the present invention may include a method that utilizes a dynamic compiler without a whole-program analysis. The method detects an invariable field in the transaction from the fields which do not belong to the immutable object of a special class or the transaction local object and makes it possible to eliminate the logging code for that field. In some embodiments, this method may include, generally, three procedures: 1. detecting a field with no write-operation in the transaction; 2. eliminating the logging code for the field; and 3. recovering the logging code for the field when a write-operation occurs.

In more detail, in the first procedure, the number of write operations that may be performed during a transaction are counted for each field. The count is not a dynamic number (i.e., the number of actually executed instructions of read/write-operations) but, rather, is created by searching the method for the total possible number of write operations.

In the second procedure, for those fields having zero write operations, a method is compiled (or recompiled) with the logging code associated therewith eliminated.

In the third procedure, after the logging code is eliminated, when a new method is invoked in the transaction, because there is a possibility that the number of write-operations of a field whose logging code is eliminated may become equal to or greater than one, it may be necessary to recover the logging code. In one embodiment, this may be accomplished by using a recompile mechanism or a dynamic code modification mechanism of a dynamic compiler. However, in this process, all of the transactions that execute the methods from which the logging code had been eliminated have to be aborted to validate the transactions correctly, so that it is desirable that this third procedure not be performed often. According to embodiments of the present invention, reducing the frequency of this procedure may be accomplished by waiting until after a new method is no longer called in the transaction and a certain number of transactions have been committed before eliminating the associated logging code.

In addition, the present invention may include a logging code deletion method for immutable objects of a special class to make it possible that the logging code for the field and array belonging to those objects is completely eliminated. The present invention analyzes each method of immutable object and eliminates the logging code for the field and array belonging to this object. For example, in getChars (int srcBegin, int srcEnd, char [ ] dst, int dstBegin), which is a method of java.lang.String, a value copy is performed from a character array in a String object to the character array (dst) of a target. No logging code is necessary for the character array of the source, though, it is required for the character array of the target.

FIG. 1 shows a logging code elimination system 100 for a transactional memory system. In FIG. 1 and the description below, a software transactional memory system (STM) is assumed; however, the present invention is not dedicated to a special transactional memory system and may be used on any STM.

The system 100 includes a virtual machine 101. The virtual machine 101 may be part of any type of computing device known in the art. For example, the virtual machine 101 may be part of personal computer or a networked terminal. In one embodiment, the virtual machine 101 may be a Java virtual machine. As used herein, the term "virtual machine" refers to a software implementation of a machine (computer) that executes programs like a real machine. An example of the implementation of a virtual machine includes a program written in Java that receives services from the Java Runtime Environment software by issuing commands from which the expected result is returned by the Java software. By providing these services to the program, the Java software is acting as a "virtual machine," taking the place of the operating system or hardware for which the program would ordinarily have had to have been specifically written.

The virtual machine 101 may include compiler 102. In one embodiment, the compiler 102 may be a JIT compiler. The system 100 may also include a compilation store 104 that holds a compiled version of the code and is coupled to the virtual machine 101 and compiler 102. In some embodiments, the compilation store 104 may include a JIT compilation of a portion of the code.

The system 100 may also include field information store 106 coupled to the compiler 102 and virtual machine 101. The field information store 106 may include a plurality of field information records. As shown, the field information store 106 includes a first field information record 108 and a second field information record 110. In one embodiment, the field information records include a field name, a Field ID, number of read-operations, number of write-operations, and a list of method names to be accessed. As shown, the first field information record 108 contains information related to a field named "A". Of importance, the number of write operations for the field A is shown a zero (0). As discussed above, this indication may be used to remove logging code for field A as discussed below. As discussed above, in general, logging code may be required to keep track of version numbers of particular fields to ensure value consistency between multiple threads. An example of when logging code may be required is when the possibility exists that a particular method may write a value to a particular field.

The system 100 may also include a recompilation store 112 and a runtime software transactional memory runtime engine 114. As shown in FIG. 1, certain connection lines are shown as solid and others are shown as dashed. A solid line indicates processing that occurs at compilation time and a dashed line indicates process that occurs at runtime.

In operation, when a method is invoked in a transaction for the first time, the number of read/write operations for the field accessed in the method is counted to update the field information records in the field information store 106. At this time, a commit count, stored in a commit counter 116, is reset.

When methods are compiled at the first invocation of the method and the method called in the transaction has a transaction version and a non-transaction version, the compiled code is stored in compilation store 104. The compiler 102 performs a read-operation/write-operation analysis of each field in the compiled portion and stores the results in the field information store 106.

After the compilation and the read-write analysis is performed, the results for each field may be examined. In the example shown in FIG. 1, the field information record 108 for field A indicates that the method invoked in the transaction does not include a field A write operations. In addition, the field information record 110 for field B indicates that the method invoked in the transaction does include a field B write operation. As such, logging code may be removed for field A but not for field B according to an embodiment of the present invention.

In one embodiment, an interpreter rather then the compiler 102 may execute the method invoked in a particular transaction. In such an embodiment, the interpreter may perform the analysis of the number of writes. In the event that a non-transaction version is not generated for each method (when only a transaction version is generated and it is judged whether it is in the transaction or not at the time of field access), analysis of read-operation/write-operation of the field is performed at the time of compilation. The information in the field information store 106 may be updated when the method is first called in the compiled code.

In one embodiment, the method is recompiled and the logging code is eliminated for the field whose number of write-operations is 0. For example, the logging code for field A may be eliminated because the number of writes involving field A is zero as indicated in first field information record 108. The method is recompiled when the number of commits exceeds a certain threshold at the end of a transaction as is shown at the recompile store 112. The number of commits is incremented when the commit succeeds and reset when a new method is invoked in the transaction. That is, the logging code is eliminated after a new method is no longer called for a certain period in the transaction. Thereby, it is possible to reduce the possibility that after the logging code is eliminated, a new method is called that may cause the logging code elimination to become invalid (i.e., a field now includes a write that it did not previously have). If a recompile store 112 has been created, the STM runtime 114 is fed instructions therefrom. Otherwise, the instructions come the compile store 104.

Figure 2:
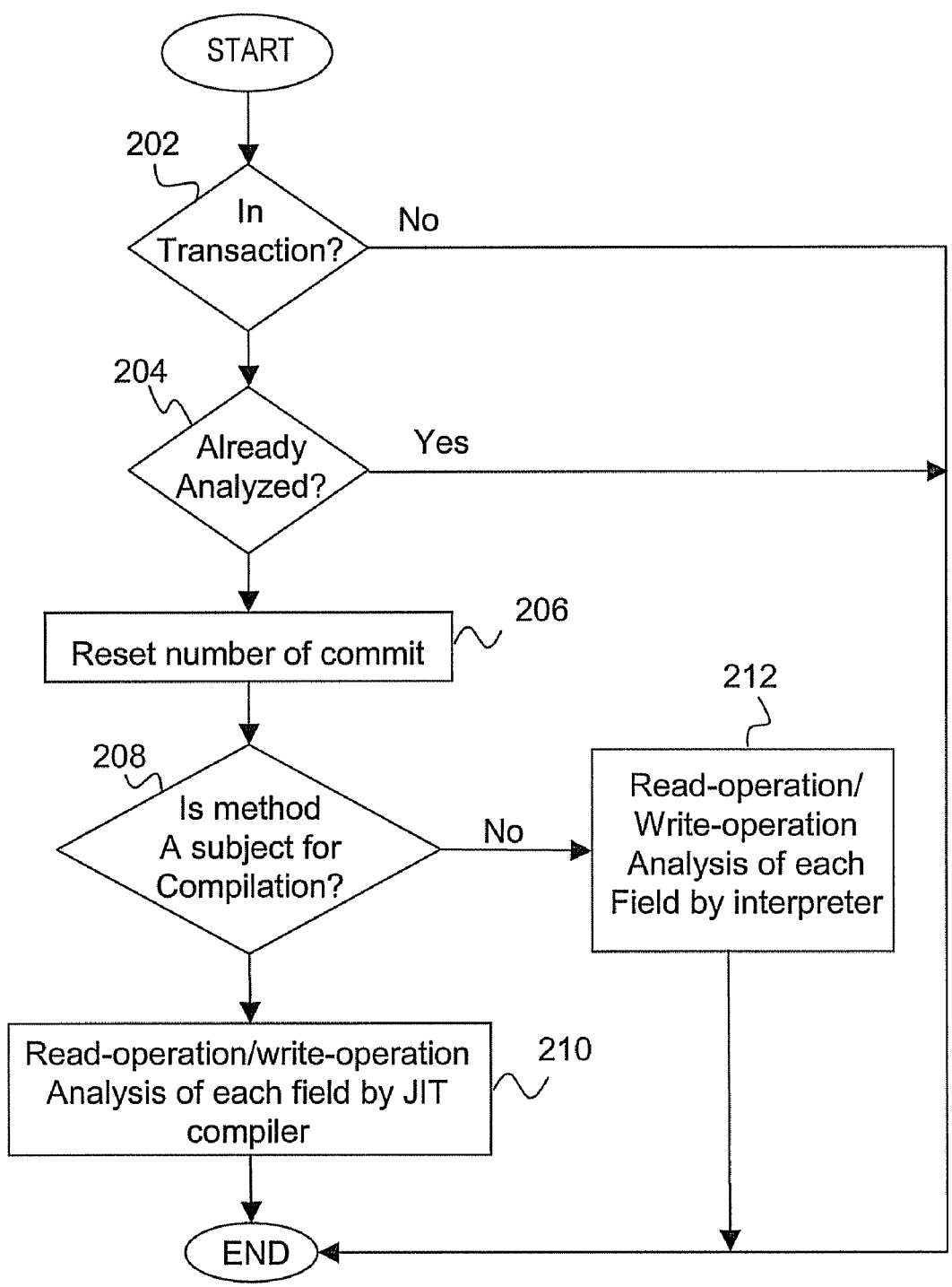
FIG. 2 is a flow diagram showing a method of determining whether a just-in-time compiler or an interpreter may be utilized according to an embodiment of the present invention.

FIG. 2 shows a method of determining whether an interpreter or a compiler will provide instructions to the STM runtime. In the case the interpreter is selected, the system may operate in the manner of the prior art. In the alternative, the compiler will provide the instructions. At a block 202, it is determined if the particular method is in a transaction. If it is not, the process ends. If the method is in a transaction, at a block 204 it is determined if the method has already been analyzed. If so, the process ends. If not, the commit number is reset for that method at a block 206. At a block 208 it is determined if the method is a subject for compilation. The determination may be made by determining if the method calls to a minimum number of other methods. If the number of other methods called exceeds the minimum number, the compiler, at a block 210, performs the analysis of the read/write operations. Otherwise, at a block 212, an interpreter, rather than the compiler may perform read/write analysis.

Figure 3:
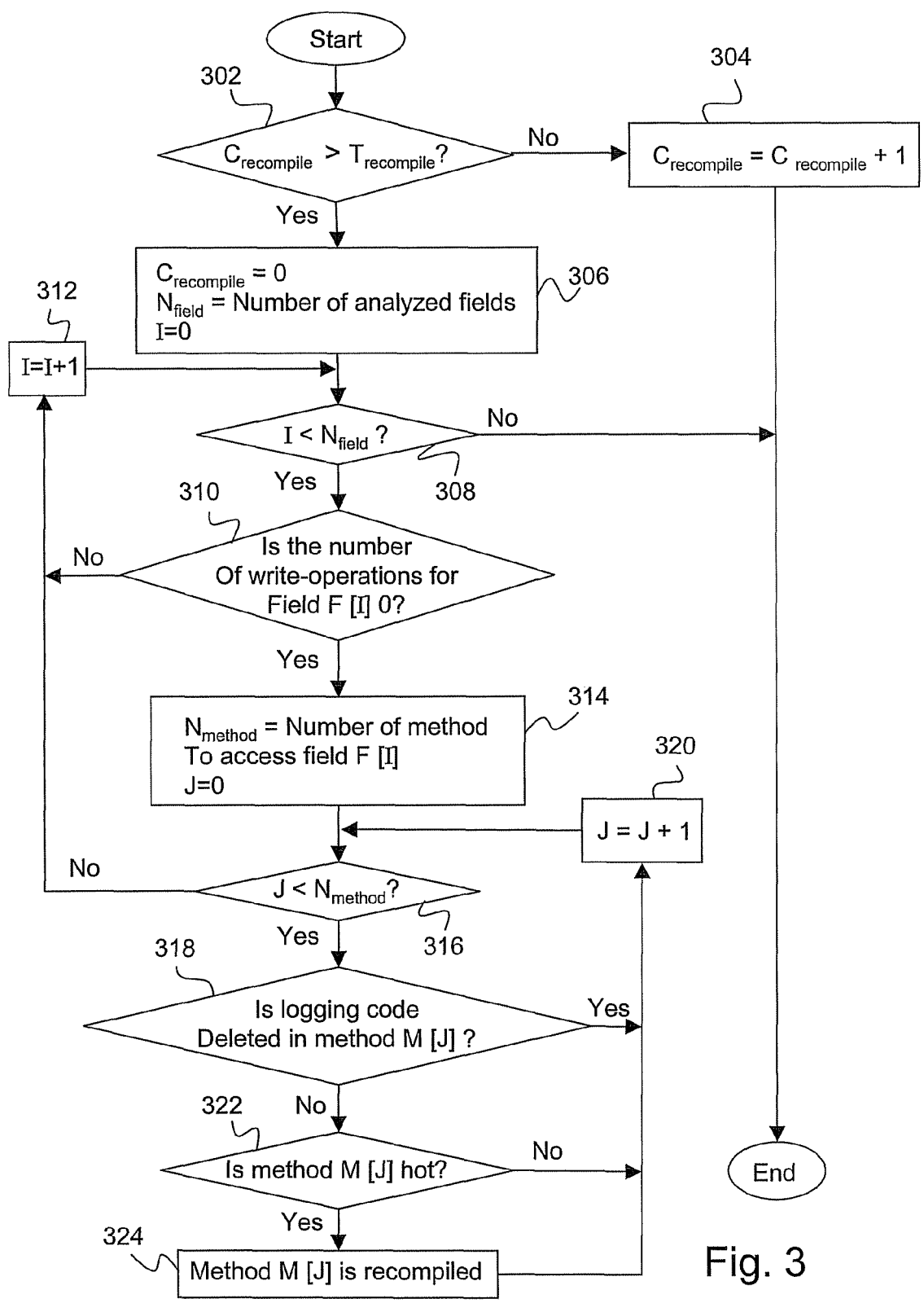
FIG. 3 shows recompilation method according to an embodiment of the present invention utilized when the number of commits exceeds a threshold.

FIG. 3 shows an algorithm of recompilation when the number of commits exceeds a threshold. Firstly, in order to reduce the overhead to judge the necessity of recompilation, it is judged whether a value ($C_{recompile}$) of a recompilation counter exceeds a threshold ($T_{recompile}$) at a block 302. Only if $C_{recompile}$ exceeds $T_{recompile}$, is the recompilation procedure is called. If $C_{recompile}$ does not $T_{recompile}$, $C_{recompile}$ is incremented at a block 304.

If $C_{recompile}$ exceeds $T_{recompile}$, at a block 306 $C_{recompile}$ is set to zero, a variable $N_{field}$ is set to the number of analyzed fields in a particular method and a variable I is set to zero.

At a block 306 it is determined if I is less than $N_{field}$. If not, the process ends as all fields have been examined. If so, at a block 308 it is determined if the write-operations for the Ith field in the method is equal to zero. If it is not, the field is not a candidate to have logging code removed. As such, the value of I is incremented at a block 310 and the next field is examined by repeating the steps in blocks 306 and 308.

If the number of write-operations for the Ith field is equal to zero, at a block 312 a value $N_{method}$ is created which equals the number of the methods that access the Ith field in the transaction and a counter J is set to zero. At a block 314 is determined if J is less than $N_{method}$. If not, the value of I is incremented at block 310 and the next field is examined. Is so, at a block 316 it is determined if logging code has been deleted in the current method. If so, no recompilation is required, J is increment at a block 318 and the process returns to block 312. If logging code has not been removed, and the method is "hot" (i.e., a frequently invoked method or a time consuming method) as determined at a block 320, at a block 322 the particular method is recompiled with logging code for the field under examination eliminated. Regardless of whether the method was hot or not, J is incremented at a block 318 and the process returns to block 314.

As discussed above, while the removal of logging code as described above may include safeguards, in some cases, after eliminating the logging code, a new method may be called in which a write-operation can occur for the field where the logging code has been eliminated. In such a case, in one embodiment, the logging code may be recovered according to the method shown in FIG. 4.

Figure 4:
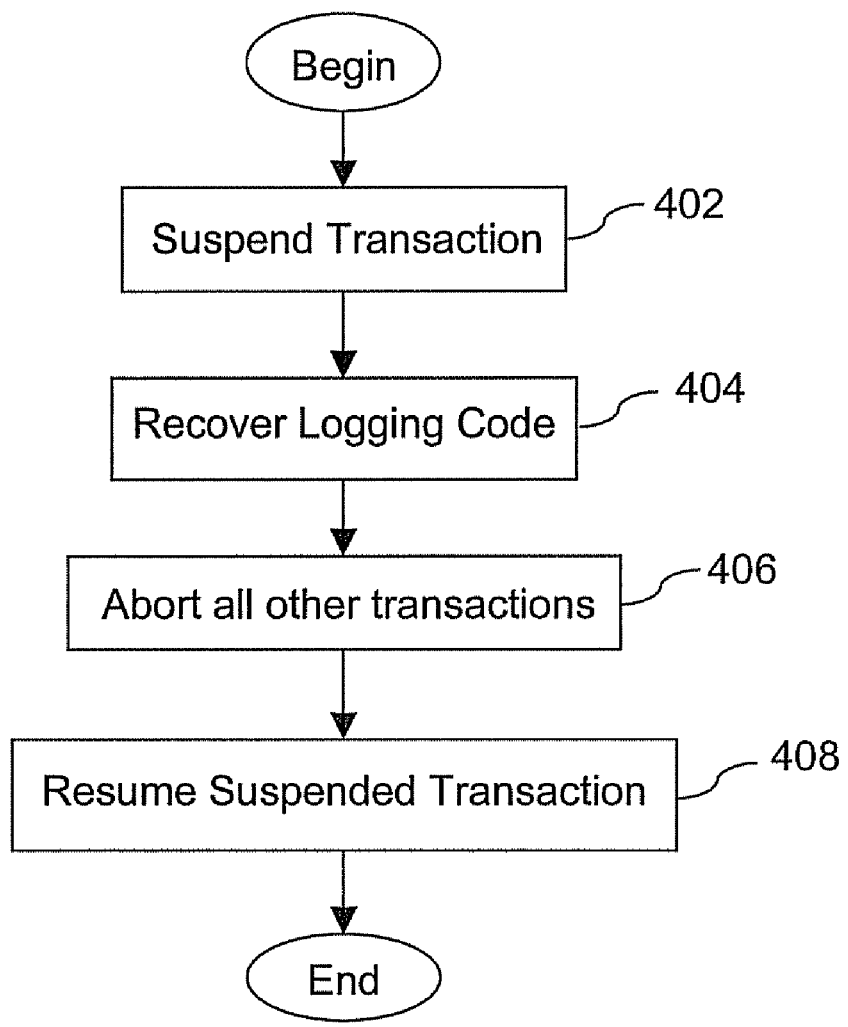
FIG. 4 is a flow diagram showing a method of recovering logging code according to an embodiment of the present invention.

FIG. 4 shows a method of recovering logging code. At a block 402 the transaction (thread) that invokes the new method is suspended. At a block 404 the eliminated logging code is recovered.

Recovery of logging code may, in one embodiment, include recompiling the method from scratch, thereby recovering the logging code. Alternatively, when eliminating the logging code, methods of one embodiment of the present invention may include eliminating logging code in an optimized version of the compiled code and keeping a non-optimized version where logging code has not been eliminated and utilizing the non-optimized version to recover the logging code. An example of such may be seen in FIG. 1. In one embodiment, however, when the logging code for multiple fields in the method is eliminated, there is a possibility that the logging code may be recovered for only particular field that no longer experiences any write-operations. As another alternative, in the compiled method, an optimized path and a non-optimized path may be prepared and a compile code is dynamically modified so that the non-optimized path is executed.

At a block 406 all other running transactions are aborted and the suspended transaction is resumed at a block 408.

In one embodiment, a transaction in which the method is not executed that is a subject of the logging code recovery may be abort at block 406. Of course, it may be beneficial to avoid such a situation. For example, for each method, every time the logging code is eliminated and recovered, a version number is assigned. When each transaction executes the method that becomes the subject of elimination and recovery of the logging code, the version number is recorded. At block 406, thus, only the transaction executing the method of the old (eliminated) version is aborted.

As described above, logging code for the field whose number of static write-operations is 0. By expanding the above to profile the number of dynamic write-operations of each field, the logging code can be eliminated for the field in which almost no write-operations are executed which exist in the method that is called in the transaction. In that case, when the write-operation instruction is actually executed, it is necessary to perform operation of logging code recovery.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. Furthermore, in some embodiments, the systems and methods disclosed herein may create a result that is either transferred to another peripheral device (such as monitor, printer, or the like), another portion of the computer, or to another computer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computing system for reducing logging code, the system comprising:

a virtual machine configured to control the flow of operations in the computing system;

a compiler, the compiler configured to receive bytecode instructions that represent a transaction from the virtual machine and convert the bytecode instructions into a first set of machine instructions, the first set of machine instructions including at least one log instruction;

a compilation store configured to receive and store the first set of machine instructions from the compiler;

a recompilation store configured to receive and store recompiled machine instructions formed by recompiling the bytecode instructions from the compiler, the recompiled machine instructions not including the at least one log instruction;

a software transactional memory engine configured to receive the first set of machine instructions from the compilation store or, in the event that the recompilation store has the recompiled machine instructions stored therein, from the recompilation store; and a field information store coupled to the compiler and containing records for each field in the bytecode instructions, wherein the records include an indication of the number of write operations for all variables for the field.

2. The system of claim 1, wherein the compiler is a just in time compiler.

3. The system of claim 1, wherein the software transaction memory is configured to receive instructions from the compilation store in the event that all fields include a write operation.

4. The system of claim 1, further including:

a commit counter coupled to the compiler and the software transactional runtime engine, the commit counter being configured to receive a reset command from the compiler and an increment command from the software transactional memory runtime engine.

5. The system of claim 4, wherein the compiler is configured to reset the commit counter in the event that a method in the software instructions is called for a first time.

6. The system of claim 5, wherein the software transactional runtime system is configured to increment the commit counter each time the method is called.

7. The system of claim 6, wherein the compiler is configured to create the recompiled byte code in the event a value stored in the commit counter exceeds a predetermined threshold.

8. A method of reducing logging code for conflict free fields in a transactional memory system, the method comprising receiving bytecode instructions that represent a transaction at a compiler, the bytecode instructions building a methods, the method including one or more fields and one or more field accesses;

compiling the bytecode instructions into machine instructions that includes logging code;

storing the machine instructions in a compilation store;

determining for of the one or more fields, the number of write operations in the machine instructions for all variables related thereto to be executed in a particular transaction;

recompiling the bytecode into recompiled machine code, recompiling including removing logging code for fields having zero write operations related thereto; and storing the recompiled machine code in a recompilation store.

9. The method of claim 8, further comprising:

storing the number of write instructions for each field in a record contained in a field information store.

10. The method of claim 9, wherein each record includes an indication of each method that references each field.

11. The method of claim 8, further comprising:

recovering the logging code for a field if the number of write operations related to the field increases.

12. The method of claim 11, wherein recovering includes:

suspending a transaction including the field;

aborting all other transactions; and resuming the suspended transaction.

13. The method of claim 8, further comprising:

determining the number of times the method has been called; and recompiling the bytecode if the method has been called more than predetermined number of times.

14. The method of claim 8, further comprising:

determining if the method is a hot method.

* * * * *